US010888160B1

(12) United States Patent
Iwasaki (10) Patent No.: US 10,888,160 B1
(45) Date of Patent: Jan. 12, 2021

(54) APPARATUS FOR CONTINUOUSLY AND ADJUSTABLY SUBDIVIDING A SPACE

(71) Applicant: Mark Hiromi Iwasaki, Mililani, HI (US)

(72) Inventor: Mark Hiromi Iwasaki, Mililani, HI (US)

( * ) Notice: Subject to any disclaimer, the term of this patent is extended or adjusted under 35 U.S.C. 154(b) by 29 days.

(21) Appl. No.: 16/533,728

(22) Filed: Aug. 6, 2019

(51) Int. Cl.
  *A47B 96/04* (2006.01)
  *F16B 5/00* (2006.01)

(52) U.S. Cl.
  CPC ............ *A47B 96/04* (2013.01); *F16B 5/0052* (2013.01); *F16B 5/0084* (2013.01)

(58) Field of Classification Search
  CPC ..... A47B 96/04; A47B 47/042; A47B 88/994; A47B 88/969; F16B 5/0052; F16B 5/0084; A47F 5/005; A47F 5/0062; A47F 5/0846
  See application file for complete search history.

(56) References Cited

U.S. PATENT DOCUMENTS

| | | | | | |
|---|---|---|---|---|---|
| 1,747,496 | A | * | 2/1930 | Vanderveld | A47F 5/005 312/140 |
| 1,767,823 | A | * | 6/1930 | Vanderveld | A47F 5/005 312/140 |
| 4,662,776 | A | * | 5/1987 | Hedstrom | E05B 65/463 403/348 |
| 5,466,058 | A | * | 11/1995 | Chan | A47B 47/0075 312/111 |
| 5,477,594 | A | * | 12/1995 | LePage | E04H 13/006 211/194 |
| 5,607,215 | A | * | 3/1997 | Pacetti | A47B 88/994 312/348.3 |
| 7,228,974 | B2 | * | 6/2007 | Ohayon | G11B 33/0433 211/40 |
| 8,388,073 | B2 | * | 3/2013 | Richter | F16B 12/38 312/108 |
| 10,744,419 | B2 | * | 8/2020 | Xia | E04H 1/1205 |
| 2005/0082240 | A1 | * | 4/2005 | Ohayon | G11B 33/0433 211/40 |
| 2008/0309211 | A1 | * | 12/2008 | Wilson | F24C 15/02 312/410 |

* cited by examiner

*Primary Examiner* — Patrick D Hawn
(74) *Attorney, Agent, or Firm* — Martin E. Hsia (57) ABSTRACT

An apparatus for continuously and adjustably subdividing a space. The apparatus contains front and rear rails, each having a rail aperture and a rail channel, a divider panel, and a first fastener and a second fastener that can be inserted into the rail aperture of the front and rear rails, respectively, and can be retained within the rail channel of the front and rear rails, respectively. Widened notches are formed in the rails more than a minimum subspace distance from surface intersections, so that fasteners for subspace-defining structures or subspace-functional elements can be inserted and removed. Preferably, the rails are inset flush with the interior surfaces of the interior space.

11 Claims, 7 Drawing Sheets

APPARATUS FOR CONTINUOUSLY AND ADJUSTABLY SUBDIVIDING A SPACE

TECHNICAL FIELD

The present invention relates to an apparatus that adjustably continuously subdivides a storage space vertically and horizontally.

BACKGROUND ART

A storage space (such as can be found, for example, in a closet, cabinet, bookshelf, credenza, or under a sink) can be subdivided into subspaces using various configurations of structural elements, such as horizontal shelves, vertical dividers, and other elements that divide a space into subspaces, for efficiency in storing various sizes of objects, aesthetics, or other reasons, such as personal taste. A storage space is usually defined by a surrounding shell, such as a cabinet or closet. Any structures that subdivide a space into a subspace are collectively referred to as "subspace-defining structures".

The subspaces can be provided with different functions, such as by providing closet rods (from which to hang clothes), doors (by mounting hinges on or near surfaces defining the space or subspaces and hanging doors on the hinges), or drawers (by mounting drawer slides or providing grooves on or near surfaces defining the space or subspaces and hanging drawers on the drawer slides, or mounting drawers in the grooves). Any devices that provide functionality to a space or subspace, such as hinges, drawer slides, closet rods, shoe racks, pant hangers, hampers, tie racks, and other accessories, are collectively referred to as "subspace-functional elements".

For example, in a closet space, a shelf unit can be used to subdivide a space vertically. The shelf unit may have two parallel and opposing right and left vertical dividers substantially the height of the closet space (or less), and optionally may have one or more horizontal shelves spanning the distance between the two vertical dividers. Of course, one of the sides of the closet space itself can form a vertical divider of the shelf unit. The shelf unit may be built or placed into the interior closet space, so that the vertical dividers vertically subdivide the closet space. Typically, the shelf unit would then be affixed in that position. Optionally, closet rods could extend between the right and left walls of the shelf unit from which clothing could be hung.

However, the subdivision described above usually cannot be adjusted after the shelf unit is affixed in place.

By way of further example, shelves can be used to horizontally subdivide an interior space of a storage space, such as a bookshelf. The bookshelf may have top, bottom, right, and left rectangular flat exterior panels, with top and bottom panels matching and right and left panels matching, with the panels' side edges meeting at right angles, and the panels' front edges defining a front opening. Interior surfaces of the four panels then define the rectangular storage space to be subdivided, and the front edges of the panels define the opening of the bookshelf. The interior surfaces of the right and left panels may have peg holes defined at spaced intervals therein, or may have brackets having such peg holes, so that pegs can be inserted into the peg holes to support a shelf, so that the shelf horizontally spans the distance between the right and left panels. Thus, the shelf horizontally subdivides the interior space of the bookshelf. Further, the pegs can be moved to new peg holes and the shelf can be placed on the pegs in the new locations. Thus, the shelf adjustably subdivides the interior space of the bookshelf. However, there are a defined number of peg holes located at discrete intervals, so the shelf can be placed only at such discrete intervals. Thus, the shelf cannot continuously subdivide the interior space of the bookshelf.

Because spaces are usually subdivided into subspaces by subspace-defining structures (such as shelves or dividers) that are fixed, when constructing or renovating residential, commercial or other structures to be provided with storage spaces, previously subdivided cabinets, closets or other storage spaces are often installed to save costs. However, an inventory of cabinets, closets or other storage spaces with various different configurations of previously subdivided spaces must then be maintained to meet consumer preferences. For example, when constructing or renovating residential habitable structures, multiple kinds of kitchen cabinets must be kept in stock, which all provide the same amount and configuration of storage space, but are subdivided into subspaces of different sizes and configurations of subspace-defining structures, and provided with different sizes and configurations of subspace-functional elements.

Further, when a home is sold to a new owner, or a new tenant moves into a home, the new owner or tenant may desire to subdivide a space differently, with different configurations and sizes of subspace-defining structures to create subspaces with different sizes and configurations, and with different selections of subspace-functional elements, to provide different functions to the subspaces.

Of course, even if the same person uses the same storage space from childhood, he or she may desire to change the sizes or functions of the subdivided spaces to accommodate, for example, larger size clothes or different types or sizes of items, such as toys or sporting goods, as the person grows.

It is also common that shelves with discretely spaced pegs or other shelf supports may have the shelf supports spaced apart at spaced intervals that are inconvenient, for example because the shelves are too small to accommodate large size books, but if one shelf is moved up one space interval to accommodate a tall item, then the consequent shortening of the subspace above becomes too small to accommodate other items.

Usually subspaces have a minimum desired dimension, either height or width, to accommodate items that are intended to be stored in the subspaces. For example, horizontal shelves are usually spaced to provide a minimum desired dimension (for the subspaces defined between the shelves) of at least approximately 7 inches (approximately 18 centimeters) so that the shelves can hold items up to that height. Similarly, vertical dividers would usually have a minimum desired dimension (for the subspaces defined between the dividers) of approximately the same minimum dimension, to hold items up to that width.

Figure 1:
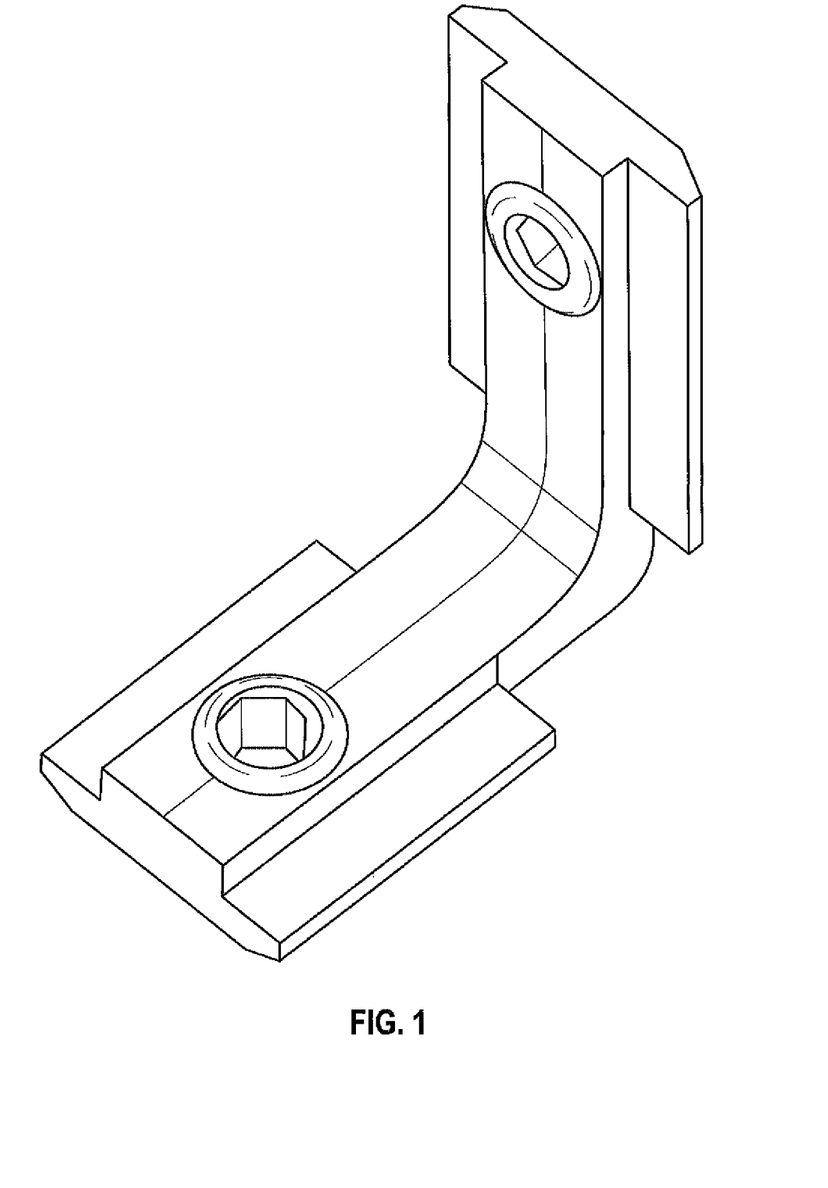
FIG. 1 is a perspective view of a hidden L connector in the prior art.
Figure 2:
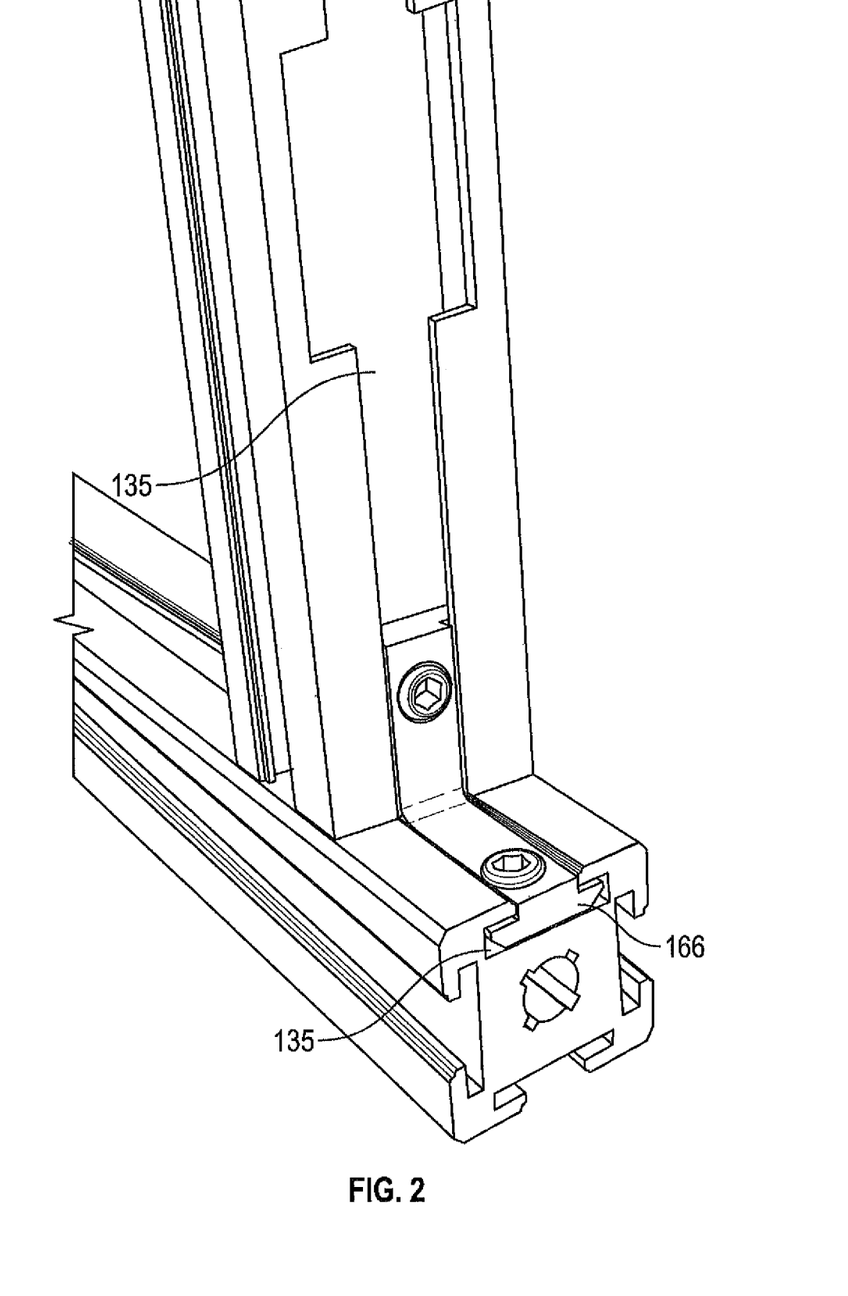
FIG. 2 is a perspective view of the hidden L connector of FIG. 1 installed in two rails to join them together, and also shows one rail incorporating a widened notch according to the presently preferred embodiment of the present invention.

Storage spaces can be formed by joining planar (flat) members together. Planar members having channels (with a narrower channel aperture) at least at their ends, can be joined and locked together at right angles near or at their ends by an L connector, preferably a lockable hidden L connector (see FIG. 1) having two legs, each with a head 166 (see FIG. 2). As shown in FIG. 2, the heads are inserted through the ends of the channels 136 (which are at the ends of the perpendicular members) and into the channels 136, retained by the narrower channel aperture, and then slid to a desired position along the channel 136, and then the connectors are locked, usually by tightening screws (see FIG. 2). After the connectors are locked to join the members together, the locked connectors block any additional connectors from being introduced into the channel through the joined ends, although connectors could still be introduced into the channel through unjoined ends. However, if both ends of a channel are locked to join members together, then no additional connectors can be introduced into any portion of the channel afterwards.

Thus, if planar members have channels at least at their ends, and L connectors are used to join four planar members together at their ends using these channels, so that the planar members form an open box, the L connectors joining the planar members together prevent any additional L connectors from being introduced into any portion of any of the channels on any of the panels.

Figure 3:
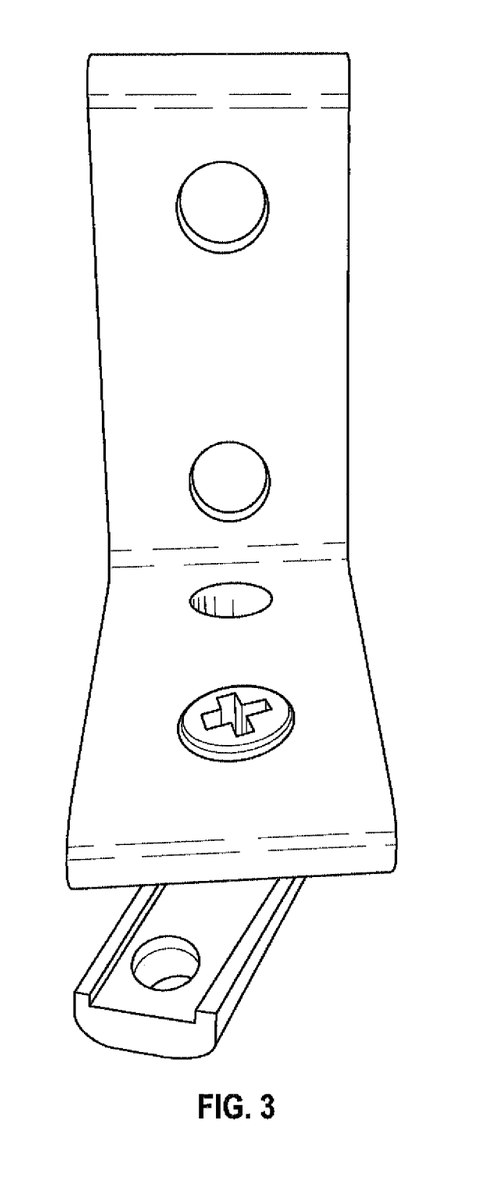
FIG. 3 is a perspective view of a surface L connector.

The L connector can be internal, such as a hidden L connector HC-010-A, or external, such as a surface L connector CB-010-C (see FIG. 3). These L connectors, and all other connectors that can be inserted into, be retained by, and slide along, channels, and then be locked into place (whether by a locking mechanism attached to the connector or separate from the connector, such as a wedge that pressures a subspace-defining structure away from a shell defining a storage space, to force the connector against the interior of the channel for frictional retention), are referred to as slidable lockable L connectors. Conventionally, the head portion of a hidden L connector is inserted into a channel through an open end of the channel, because the head portion is too large to fit through the channel aperture (see FIG. 2).

U.S. Pat. No. 6,988,628 to Krieger, incorporated herein by reference, discloses a closet storage system comprising a storage component and an adjustable and lockable engagement member. The engagement member engages the storage component to secure the storage component in position within a closet.

It is therefore an object of this invention to provide adjustable continuous subdivision of a storage space, both vertically and horizontally, in a simple manner, using a minimum number of component parts, without the need for an inventory of shells with preselected sizes and configurations of subspaces.

DISCLOSURE OF THE INVENTION

The present invention is an apparatus for adjustably continuously subdividing a rectangular storage space into subspaces with dimensions larger than a minimum subspace dimension. The storage space has right and left opposite vertical interior surfaces, and top and bottom opposite horizontal interior surfaces. All the interior surfaces are substantially flat. The horizontal interior surfaces are parallel to and spaced apart by a vertical span, and the vertical interior surfaces are parallel to and spaced apart by a horizontal span. Intersections between the interior surfaces define surface intersections. The interior surfaces define a rectangular front opening to the storage space perpendicular to the surface intersections. The invention comprises:

front and rear rails mounted on each of the interior surfaces, with all the front rails being parallel to, and spaced a setback distance from, the front opening, and all the rear rails being parallel to, and spaced a separation distance from, the front rails; and a subspace-defining structure having a front edge and a rear edge parallel to the front edge, and right and left edges perpendicular to the front and rear edges.

Front and rear rails are mounted on the subspace-defining structure, the front rail being parallel to, and spaced the setback distance from, the front edge, and the rear rail being parallel to, and spaced said separation distance from, front rail.

Each of the rails is straight and has two ends, a rail length between the ends, and a channel extending at least partially along the rail length having a partially closed interior cross section with a rail channel aperture narrower than the interior cross section communicating between the storage space and the interior cross section. At least one of the rails mounted on the interior surfaces has a widened notch wider than the rail channel aperture and having a notch length communicating with the rail channel aperture, with the notch entirely located less than the minimum subspace dimension from the nearest surface intersection.

A first front slidable lockable fastener is received in the front rail mounted on the subspace-defining structure and also received in the front rail mounted on a first of the interior surfaces, and a first rear slidable lockable fastener is received in the rear rail mounted on the subspace-defining structure and also received in the rear rail mounted on the first interior surface. Each of the slidable lockable fasteners has two legs, each leg with a head portion and a neck portion, with the head portion being larger than the rail channel aperture, but smaller than the interior cross section and also smaller than the widened notch, and the neck portion being smaller than the rail channel aperture. The head portions can fit through the widened notches of the rails and be received inside the interior cross sections of the partially closed channels of the rails, and slide inside the partially closed channels, with the neck sliding along the rail channel aperture, to a desired position. The subspace-defining structure can be locked in place when the subspace-defining structure is slid to a desired location along the rails, so that the fasteners are slidably lockably retained at the desired location in the rails by the heads and said necks, except at the widened notches. The storage space can be continuously adjustably subdivided to form a subspace larger than the minimum subspace dimension by sliding the subspace-defining structure along the rails and locking the slidable lockable fasteners when said subspace-defining structure is in a desired location on the rails that is farther from the nearest surface intersection than the minimum subspace dimension.

The apparatus further comprises:

a second front slidable lockable fastener received in the front rail mounted on the sub-space defining structure and also received in the front rail mounted on a second interior surface opposite the first interior surface, and a second rear slidable lockable fastener received in the rear rail of the subspace-defining structure and also received in the rear rail mounted on the second interior surface. Each of the fasteners has two legs, each leg with a head portion and a neck portion, with the head portion being larger than the rail channel aperture, but smaller than the interior cross section and also smaller than the widened notch, and the neck portion being smaller than the rail channel aperture, whereby the head portions can fit through the widened notches of the rails and be received inside the interior cross sections of the partially closed channels of the rails, and slide inside the partially closed channels, with the neck sliding along said rail channel aperture, to a desired position. Thus, the subspace-defining structure can be locked in place when the subspace-defining structure is slid to a desired location along the rails, whereby the fasteners are slidably lockably retained at the desired location in the rails by the heads and said necks, except at the widened notches.

Preferably, the rails are attached to the interior surfaces by being inset into the interior surfaces so the rail channel aperture and the widened notch are approximately flush with the interior surfaces.

Practically, the widened notch is approximately 2 inches (approximately 5 centimeters) long and extends between approximately 5 inches (approximately 13 centimeters) and approximately 7 inches (approximately 18 centimeters) from a surface intersection.

Preferably, the widened notch is approximately 2 inches (approximately 5 centimeters) long and extends between approximately 4 inches (approximately 10 centimeters) and approximately 6 inches (approximately 15 centimeters) from a surface intersection.

Preferably, the rail lengths of the rails mounted on the horizontal interior surfaces are at least equal to the horizontal span, whereby the rails mounted on the horizontal surfaces intersect with the rails mounted on the vertical surfaces at the surface intersections.

Preferably, the rail lengths of the rails mounted on the vertical surfaces are at least equal to the vertical span, whereby the rails mounted on the vertical surfaces intersect with the rails mounted on the horizontal surfaces at the surface intersections.

In another embodiment, the invention is an apparatus for adjustably continuously subdividing a rectangular storage space into subspaces with dimensions larger than a minimum subspace dimension, comprising:

a shell having a right interior surface, a left interior surface, a top interior surface and a bottom interior surface, wherein all the interior surfaces are substantially flat, wherein the right interior surface is parallel to and spaced apart by a horizontal span from the left interior surface, and wherein the top interior surface is parallel to and spaced apart by a vertical span from the bottom interior surface, so that intersections between the interior surfaces define surface intersections, and whereby the interior surfaces define a rectangular front opening to said storage space perpendicular to said surface intersections, front and rear rails mounted on each of the interior surfaces, all the front rails being parallel to, and spaced a setback distance from, the front opening, and all the rear rails being parallel to, and spaced a separation distance from, the front rails, wherein each of the rails is straight and has two ends, a rail length between the ends, and forms a channel extending at least partially along the rail length having a partially closed interior cross section with a rail channel aperture narrower than the interior cross section communicating between the storage space and the interior cross section. At least one of the rails mounted on the interior surfaces has a widened notch wider than the rail channel aperture communicating with the rail channel aperture located at most approximately 6 inches (approximately 15 centimeters) from a surface intersection, with the notch entirely located less than the minimum subspace dimension from the nearest surface intersection;

a subspace-defining structure having a first edge and an opposite edge;

a first front fastener and a first rear fastener each attached to the first edge of the subspace-defining structure, separated by the separation distance, wherein each of the fasteners has a head portion and a neck portion, with the head portion being larger than the rail channel aperture, but smaller than the interior cross section and also smaller than the widened notch, whereby the head portions can fit through the widened notches of at least one of the rails and be received inside the interior cross sections of the partially closed channels of at least one of the rails, and slide inside the partially closed channels, whereby the fasteners are slidably retained in said rail except at the widened notches;

a releasable locking mechanism operably connected to the subspace-defining structure to lock the subspace-defining structure in place when the subspace-defining structure is slid to a desired location along the rail;

so that the space can be continuously adjustably subdivided by sliding the subspace-defining structure along the rails and locking and unlocking the locking mechanism when the subspace-defining structure is in a desired location on said rails.

The invention is also an apparatus for continuously and adjustably subdividing a space defined by a shell having four flat interior surfaces each with a surface length, into subspaces with dimensions larger than a minimum subspace dimension, comprising:

front and rear rails attached to each of the interior surfaces, wherein the front and rear rails on each surface are parallel and coplanar to each other and separated by a separation distance, wherein each of the front and rear rails has two ends, a rail length between the ends, and a channel extending at least partially along the rail length having a partially closed interior cross section with a rail channel aperture narrower than the interior cross section communicating between the space and the interior cross section, and a widened notch wider than the rail channel aperture and having a notch length communicating with the rail channel aperture, located less than the minimum subspace dimension from a surface intersection;

a divider panel having a divider panel length; and a first fastener and a second fastener each attached to the divider panel, wherein the first fastener and the second fastener are separated by the separation distance, wherein the first fastener has a head with a head width less than the rail aperture width and greater than the channel width, whereby the first fastener can be inserted into the rail channel aperture of the front rail, whereby the first fastener can slidably lockably engage with the front rail, whereby the second fastener can be inserted into the rail channel aperture of the rear rail, so that the second fastener can slidably lockably engage with the rear rail, and whereby the storage space can be continuously adjustably subdivided by sliding the divider panel and locking the first fastener and the second fastener in desired locations in the rail channels, and wherein one of the rail lengths is shorter than the surface length of the interior surface to which the rail is attached.

The invention also is an apparatus for creating a storage space and for continuously and adjustably subdividing the storage space, comprising:

two pairs of rectangular panels joined to form a box open at both ends, each panel having a panel length, an interior surface and a front edge, each member of a pair having the same panel length, whereby intersections between the interior surfaces define surface intersections, and whereby the front edges define a rectangular front opening to the storage space perpendicular to said surface intersections;

for each panel, front rails inset flush into the interior surface parallel and spaced apart by a setback distance from the front edge;

for each panel, rear rails inset flush into the interior surface parallel and spaced apart by a separation distance from the front rails;

wherein each of the rails is straight and has two ends, a rail length between the ends, and forms a channel extending at least partially along the rail length having a partially closed interior cross section with a rail channel aperture narrower than the interior cross section communicating between the storage space and the interior cross section. At least one of the rails mounted on the interior surfaces has a widened notch wider than the rail channel aperture communicating with the rail channel aperture located at most approximately 6 inches (approximately 15 centimeters) from a nearest surface intersection;

a first front fastener and a first rear fastener separated by the separation distance, each attached to a subspace-defining structure, wherein each of the fasteners has a head portion and a neck portion, with the head portion being larger than the rail channel aperture, but smaller than the interior cross section and also smaller than the widened notch, whereby the head portions can fit through the widened notches of at least one of the rails and be received inside the interior cross sections of the partially closed channels of at least one of the rails, and slide inside the partially closed channels, whereby the fasteners are slidably retained in the rails except at the widened notches;

a releasable locking mechanism operably connected to the subspace-defining structure to lock the subspace-defining structure in place when the subspace-defining structure is slid to a desired location along the rails;

whereby the storage space can be continuously adjustably subdivided by sliding the subspace-defining structure along the rails and locking and unlocking the locking mechanism when the subspace-defining structure is in a desired location on the rails.

In another aspect, this invention provides an apparatus for providing continuously adjustable subspace-functional elements to a storage space defined by a shell having four flat interior surfaces each with a surface length, whereby intersections between the interior surfaces define surface intersections, and whereby the interior surfaces define a rectangular front opening to the storage space perpendicular to the surface intersections, with the storage space having a minimum desired subspace dimension, comprising:

front and rear rails attached to each of the interior surfaces, wherein the front and rear rails on each interior surface are parallel and coplanar to each other and separated by a separation distance, wherein each of the front and rear rails has two ends, a rail length between the ends, and a channel extending at least partially along the rail length having a partially closed interior cross section with a rail channel aperture narrower than the interior cross section communicating between the storage space and the interior cross section, at least one of the rails attached to one of the interior surfaces having a widened notch wider than the rail channel aperture and having a notch length communicating with the rail channel aperture, located less than the minimum subspace dimension from the nearest surface intersection;

a first fastener and a second fastener each attached to the subspace-functional element, wherein the first fastener and the second fastener are separated by the separation distance, wherein the first fastener has a head with a head width less than the rail aperture's width and greater than the channel's width, whereby the first fastener can be inserted into the rail channel aperture of the front rail, whereby the first fastener can slidably lockably engage with the front rail, whereby the second fastener can be inserted into the rail channel aperture of the rear rail, whereby the second fastener can slidably lockably engage with the rear rail, and whereby said subspace-functional element can be continuously adjustably positioned by sliding said subspace-functional element and locking said first fastener and said second fastener in desired locations in said channels.

More specifically, this invention relates to parallel sets of front and rear rails inset into interior surfaces of a shell having a rectangular cross section, that defines a storage space having an open front. The front and rear rail in each set are separated by a separation distance and the rails preferably extend the entire width of the interior surface in which they are inset. Each of the front and rear rails has two ends and defines a partially closed channel extending the entire length of the rails having a uniform interior cross section, and a narrower rail channel aperture approximately coplanar with the interior surface leading into the interior cross section, having a substantially uniform channel width, except for a widened notch portion of the rail channel aperture having a substantially uniform notch width, closer to one end of the rail by a notch distance greater than the desired minimum subspace dimension, and preferably approximately 2 inches (approximately 5 centimeters) long, extending between approximately 5 inches (approximately 13 centimeters) and approximately 7 inches (approximately 18 centimeters) away from one of the ends of the rail.

The apparatus further includes a subspace-defining structure, such as a divider panel having a divider panel width and a divider panel depth and the same front and rear rails attached.

Preferably, the apparatus also includes at least two slidable lockable fasteners, preferably hidden L connectors. Each of the fasteners has two perpendicular legs, and each leg has a head portion and a neck portion. The head portions of the fasteners are larger than the rail channel apertures, but smaller than the interior cross sections and also smaller than the widened notches, so that the head portions can fit through the widened notches of the rails and be received inside the interior cross sections of the rails, and slide along the channels, with the fasteners being retained in the rails because, except for the widened notches, the neck portions are narrower than the rail channel apertures of the front rail.

The slidable lockable fasteners are locked in place when the fasteners are slid to desired locations along the rails, such as by a screw in an L connector bracket that can be tightened to bear against the interior surface of the shell or of a subspace-defining structure.

Thus, for example, the head portion of one leg of the first fastener can be inserted through the widened notch of a front rail on a subspace-defining structure, such as a divider or shelf, and then slid to a desired position in that front rail, then the subspace-defining structure can be moved so that the head portion of the other leg of the first fastener can be inserted through the widened notch of a front rail on the shell. The subspace-defining structure can then be moved to a desired location, and the fastener can be slid to a desired position on the rails of both the subspace-defining structure and the shell and locked in place on the rails of the shell and the subspace-defining structure by the locking mechanism, to lock the subspace-defining structure in the desired position. The same is simultaneously done with the second fastener, and any additional fasteners that may be desired.

By this invention, subspace-defining structures can subdivide the space into subspaces of desired dimensions, by sliding the subspace-defining structures such that the slidable lockable fasteners slide along the front and rear rails, respectively, until the subspace-defining structures reach a desired location to create subspaces of desired dimensions. The fasteners can then be locked in place using the locking mechanism or any other manner known in the art.

Subspace-functional elements, such as drawer slides or hinges or closet rods, can also be mounted on, or otherwise provided with, slidable lockable fasteners, so that the subspace-functional elements can slide along the front or rear rails, or both, to a desired location, and locked in place as well. This avoids the need to drill holes or otherwise make permanent alterations to the storage space to secure subspace-functional elements in a desired location, and then drill additional holes, or make additional permanent alterations, if the subspace-functional elements are moved to a different location later. Indeed, subspace-functional elements could be used without being subdivided by a subspace-defining structure, such to provide a storage space with a movable closet rod, or a drawer mounted on movable drawer slides.

Very importantly, because of the widened notches, slidable lockable fasteners can be added and removed as desired, without disassembling the shell or storage space, which allows adding or subtracting or swapping subspace-defining structures (such as dividers and shelves) or subspace-functional elements (such as door hinges or drawer slides).

In a particularly preferred embodiment, because the rails on the shell and on the subspace-defining structures are all parallel, with the front rails spaced apart from the opening by the setback distance, and the rear rails spaced apart from the front rails by the separation distance, all the elements of the shell and many of the subspace-defining structures and subspace-functional elements can be made from segments of rectangular material with a flat surface, having parallel front rails inset flush with the surface into the material spaced apart from a front edge by the setback distance, and having parallel back rails inset flush with the surface into the material spaced apart from the front rails by the separation distance. The shell defining a storage space can then be formed by perpendicularly joining 4 lengths of this material (a pair of one length and a pair of another length) at or near their respective ends, with the widened notches less than the minimum subspace dimension from the ends, to form a rectangular shell having surface intersections where the interior surfaces meet and with the rails on the interior of the space formed by the shell. Because the front and rear rails would intersect at the surface intersections, L connectors or other types of connectors can be used to join the segments together to form the shell. Various subspace-defining structures, such as shelves and dividers, and some subspace-functional elements, such as drawers, also could be made from these segments. This would avoid the need for preassembled shells, which could make transportation, storage, installation, customization and repair much easier and more economical.

It is particularly preferred that the rails be inset into, and flush with, the interior surfaces of the panels, so that side edges of panels (and therefore ends of rails) can abut directly against side edges of adjacent panels (and therefore ends of rails). By flush is meant that no portion of the rails protrudes substantially outwardly from the surface. If the rails were not inset into, and flush with the interior surfaces of, the panels, then any non-flush portions of the rails would block the panels from directly abutting against each other at the surface intersections (the side edges where the surfaces intersect with each other). This is not only for aesthetics, but also because insetting the rails flush with the surfaces allows entire storage spaces, such as closets and sets of drawers and cabinets, to be constructed only from such panels. If the rails are inset flush with the surfaces, the panels can be joined to form shells to define storage spaces by using the same slidable lockable fasteners that are used for the divider panels, avoiding the need for storing and transporting different types of fasteners for forming the shell and fastening the subspace-defining structures. If the rails are not inset, they would obstruct the side edges of the panels from abutting against each other, thereby preventing joining the panels with L connectors to form the shell. If the notches are too close to the surface intersections, the L fasteners could not join the panels to form the shell. The panels can be much more easily transported than shells that have been assembled. Also, the same types of panels can be used to form shells and subspace-defining structures, so if panels of desired dimensions for shells or subspace-defining structures are not at an installation location, already-present panels can be cut to panels of desired dimensions, if the rails are provided with widened notches spaced apart so that the cuts result in panels of desired dimensions with notches less than the minimum subspace dimension away from surface intersections.

It is preferred that the widened notches start far enough away from the side edges of the panels that L connectors or other fasteners can be used in the rails to join the panels together to form the shell. If the widened notches are too near the side edges of the panels, they will prevent the L connectors or other fasteners from joining the panels together to form the shell.

Because the widened notches are less than the minimum subspace dimension from the surface intersections that form the corners of the shell, they do not interfere with the range of dimensions of subspaces that can be created.

The configuration of the fasteners is not critical to the present invention—any fastener can be used with a head that can pass through the widened notch of a rail, but be retained in the channel because the head is larger than the narrower rail channel aperture, as long as the fastener can slide along the rail because the neck is smaller than the rail channel aperture that leads to the interior.

BEST MODES FOR CARRYING OUT THE INVENTION

Figure 4:
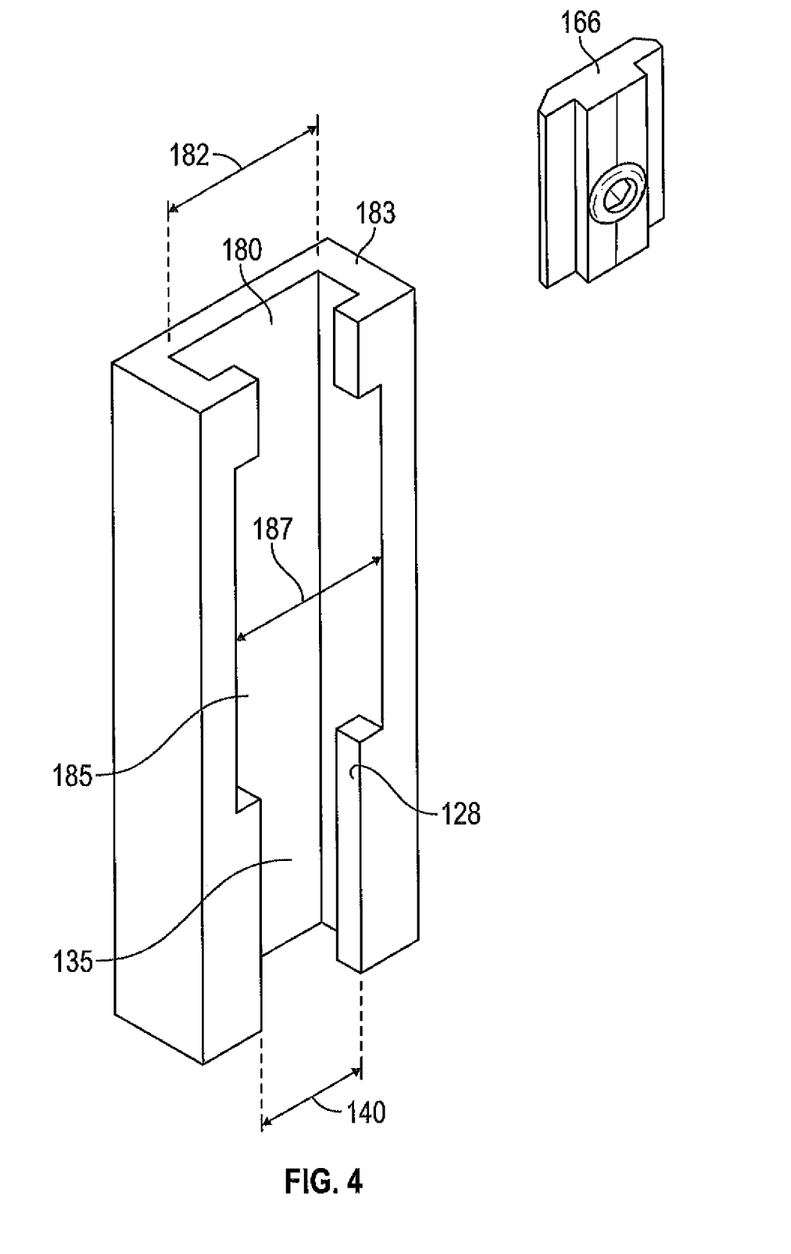
FIG. 4 is a perspective view of a rail with a widened notch according to the presently preferred embodiment of the present invention, and a portion of a fastener (such as the head of one leg of the hidden L connector of FIG. 1), showing how the fastener can be inserted into the widened notch and slide along the rail.

Presently preferred best modes for practicing the present invention are presently illustrated by way of example as follows:

FIG. 4 is a perspective view showing a rail in accordance with a preferred embodiment of the present invention, removed from the panel into which the rail is inset (for clarity). The end of the rail 183 preferably extends substantially to the side edge of the panel into which the rail is inset. Preferably, the rail has a rail channel 128 having a rail channel width 140, leading into a rail channel 135 having a uniform interior cross section, and having an open end 180 having an open end width 182. The open end width 182 is large enough to receive the head 166 of a fastener as described herein and the rail channel width 140 is small enough to retain the head 166 of a fastener as described herein. A widened notch 185 having a notch width 187 that is wider than the rail channel width 140 and wider than the head 166 is provided in the rail channel 128, spaced apart from the end of the rail 180 (also see FIG. 2).

Figure 5:
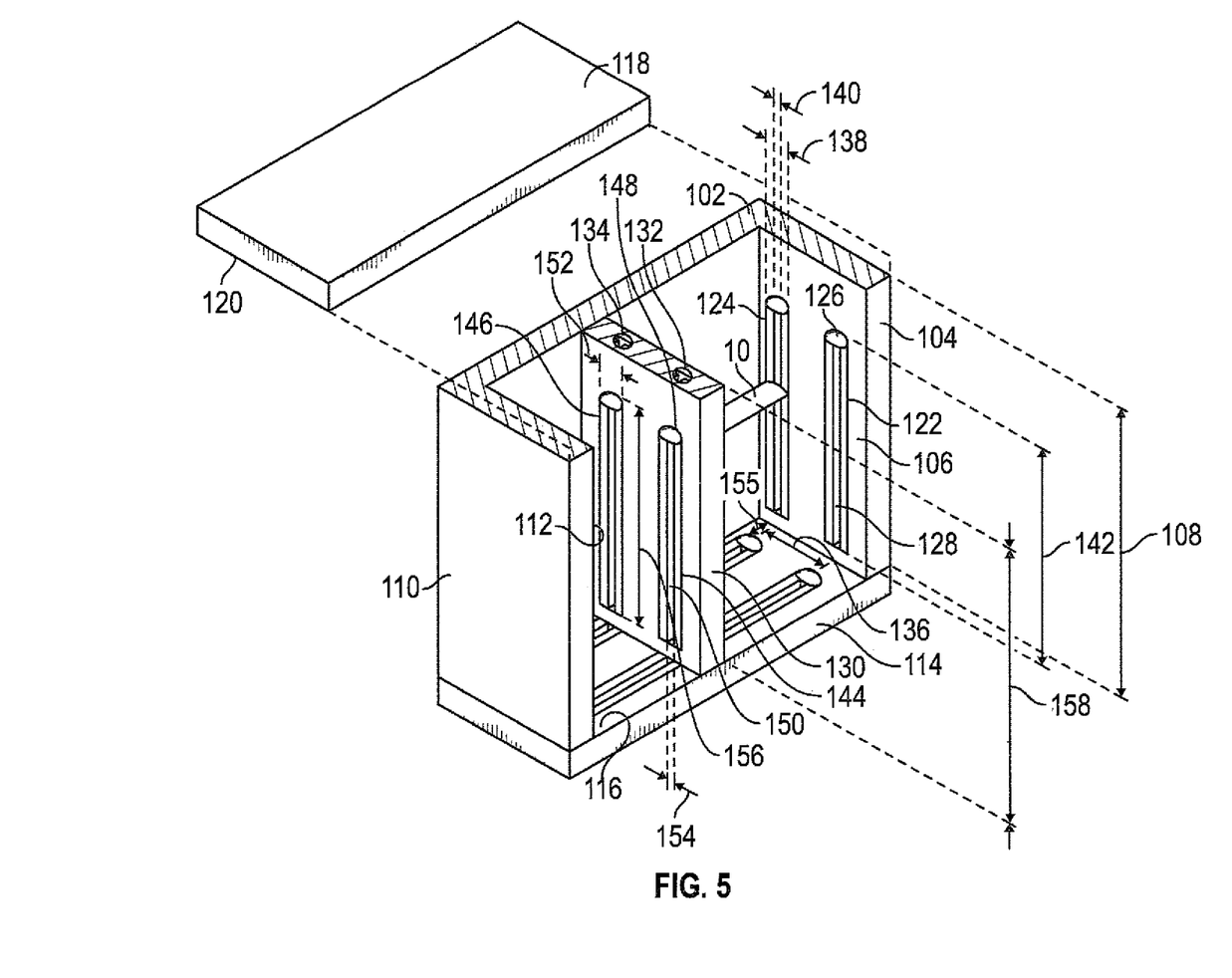
FIG. 5 is an exploded view of an alternative preferred embodiment of the present invention.

Referring to FIG. 5, shown is a partially exploded view of a shell 102. Shell 102 includes a right panel 104 having a right panel interior surface 106, a left panel 110 having a left panel interior surface 112, a bottom panel 114 having a bottom panel interior surface 116, and a top panel 118 (shown as separated from the remaining elements of the preferred best mode), having a top panel interior surface 120. Optionally, the shell 102 has a back. The shell 102 is open in front.

Attached to the top panel interior surface 120, the right panel interior surface 106, the left panel interior surface 112, and the bottom panel interior surface 116 are front rails 122 and rear rails 124. The front rail 122 and rear rail 124 attached to each panel are separated by a separation distance 136. Each front rail 122 and rear rail 124 has two ends and a rail aperture 126, having a rail aperture width defined at or near one of the ends. Each front rail 122 and rear rail 124 has a rail channel 128 defined therein, and each rail channel 128 has a rail channel width 140. Each front rail 122 and rear rail 124 has a rail length 142.

Preferably, the rails extend the entire length of their respective panels, and are provided with widened notches 185 (see FIG. 4), but as shown in FIG. 5, the rails can also extend only partially across the panels, leaving a gap less than or equal to the minimum subspace dimension between the end of the rail and the adjoining panel 155, so that fasteners can be inserted into the channel through the ends of the rails.

In the presently preferred best mode, there is a divider panel 130 and a first fastener 132 and a second fastener 134 attached thereto. The divider panel 130 has a divider panel length 158. The first fastener 132 and second fastener 134 can pass through the widened notch 185 (see FIG. 4), or through the space between the end of the rail and the panel (see FIG. 5), and slidably and lockably engage with the front rails and rear rails (not shown) in the top panel interior surface 120.

In the presently preferred best mode, there is a front divider rail 144 and rear divider rail 146 attached to the divider panel. The front divider rail 144 and rear divider rail 146 are parallel and coplanar and separated by the separation distance 136. The front divider rail 144 and rear divider rail 146 each have a divider rail length 156 and extend substantially along the divider panel length 158. The front divider rail 144 and rear divider rail 146 each has a divider rail aperture 148 having a divider rail aperture width 152, and a divider rail channel 150 having a divider rail channel width 154.

Figure 6:
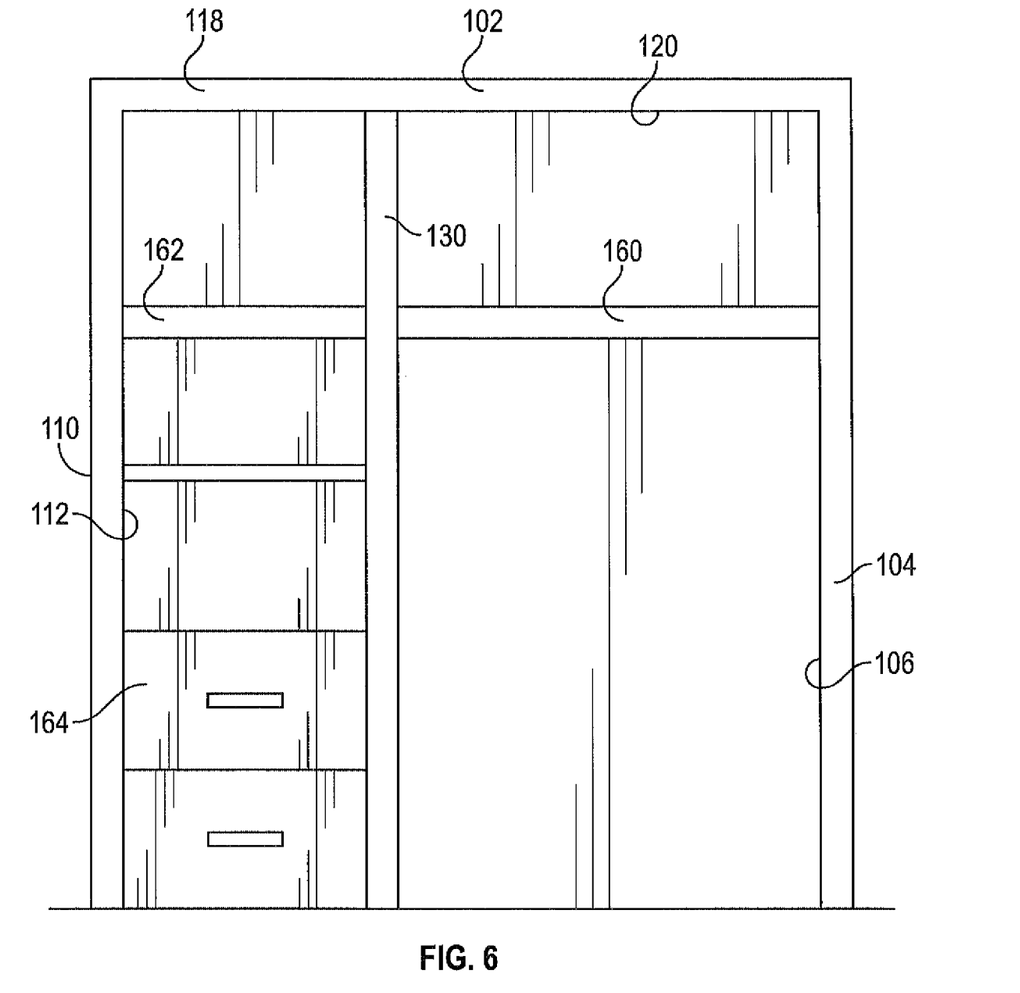
FIG. 6 is a front view of a preferred embodiment of the present invention.

Referring to FIG. 6, a front view of another preferred best mode of the present invention is shown. Shell 102 includes a right panel 104 having a right panel interior surface 106, a left panel 110 having a left panel interior surface 112, and a top panel 118 having a top panel interior surface 120. Attached to the shell 102 by way of the front rails 122 and rear rails 124 (not shown) and first fasteners 132 and second fasteners 134 (not shown) are divider panel 130, closet rod accessory 160, shelf accessory 162, and drawer slide accessory 164.

Figure 7:
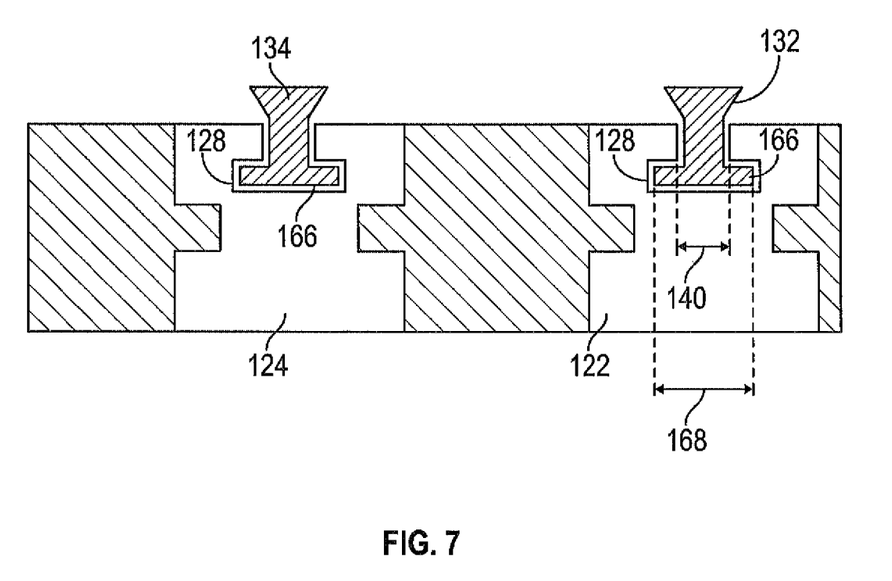
FIG. 7 is a cross-sectional view of a panel with attached front and rear rails in accordance with a preferred embodiment of the present invention.

Referring to FIG. 7, a cross-sectional view of one of the top panel 118, bottom panel 114, right panel 104, and left panel 110 is shown with front rail 122 and rear rail 124 attached in accordance with a present preferred best mode. As shown in FIG. 7, there is a first fastener 132 which has a head 166 having head width 168. The first fastener 132 is inserted into the rail aperture 126 (see FIG. 5) or widened notch 185 (see FIG. 4) of the front rail 122 and then slides in the rail channel 128 thereof. Because the head width 168 is larger than the channel width 140, the head 166 cannot be disengaged from the rail channel 128 except at the rail aperture 126 which has a rail aperture width 138 (see FIG. 5) wider than the head width 168, or at the widened notch 185. Similarly, there is a second fastener 134 which is inserted into the rail aperture 126 (see FIG. 5) or widened notch 185 (see FIG. 4) of the rear rail 124 and then slides in the rail channel 128 thereof. Because the head width 168 of the second fastener 134 is larger than the channel width 140 of the rear rail 124, the head 166 cannot be disengaged from the rail channel 128 except (1) at the open end 180 of the rail aperture 126, which has a rail aperture width 138 wider than the head width 168 (see FIG. 5), or (2) at the widened notch 185 (see FIGS. 2 and 4).

Figure 8:
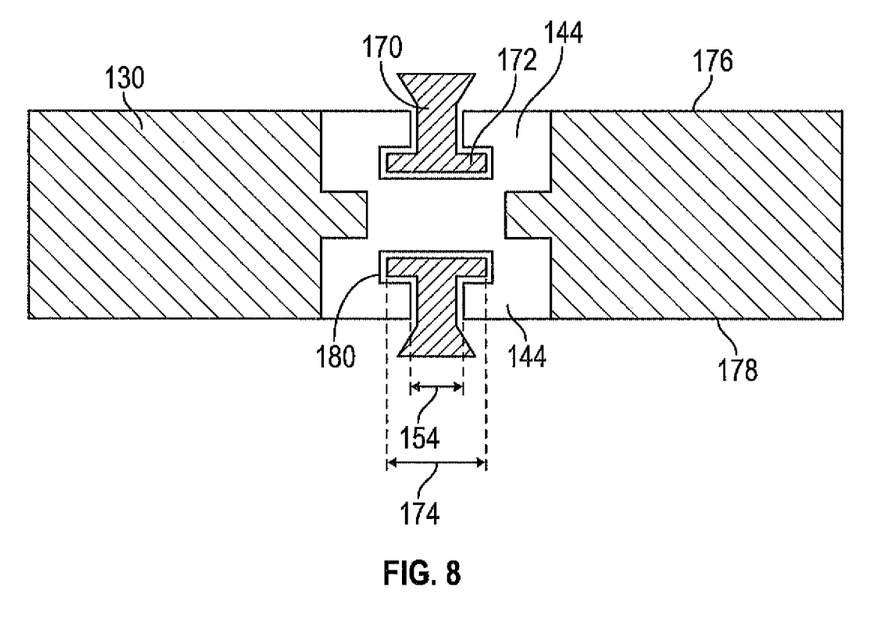
FIG. 8 is a cross-sectional view of a portion of a divider panel with two front divider rails on opposite sides attached in accordance with a preferred embodiment of the present invention.

Referring now to FIG. 8, a top cross-sectional view of a portion of a divider panel 130 with an attached (preferably by being inset) front divider rail 144 in accordance with a preferred best mode is shown. Front divider panel 130 has a first divider panel surface 176 and a second divider panel surface 178. Both first divider panel surface 176 and second divider panel surface 178 have a front divider rail 144 attached thereto, preferably by being inset. As shown in FIG. 5, each front divider rail 144 has a divider rail channel 150 having a divider rail channel width 154. As shown in FIG. 8, there are divider fasteners 170 having a divider fastener head 172 with a divider fastener head width 174. The divider fasteners 170 are inserted into the widened notch 185 (see FIG. 4) of the front divider rails 144 and then slide in the divider rail channel 150 thereof. Because the divider fastener head width 174 is larger than the divider rail channel width 154, the divider fastener heads 172 cannot be disengaged from the divider rail channels 150 except at the divider rail apertures 148, which have a divider rail aperture width 152 (see FIG. 5) that is wider than the divider fastener head width 174, or at the widened notches 185 (see FIG. 4).

While the present invention has been disclosed in connection with the presently preferred best modes described herein, it should be understood that this specification includes words of description and illustration, rather than words of limitation. There may be other embodiments that fall within the spirit and scope of the invention as defined by the claims. For example, it may be desired to provide fasteners and inset channels with widened notches only on vertical interior surfaces, or only on horizontal interior surfaces, so that storage spaces can only be adjustably continuously subdivided only vertically or only horizontally. Accordingly, no limitations are to be implied or inferred in this invention, except as specifically and explicitly set forth in the claims.

INDUSTRIAL APPLICABILITY

The present invention is applicable whenever it is desired to continuously and adjustably subdivide a space by attaching a divider panel or an accessory.

What is claimed is:

1. An apparatus for adjustably continuously subdividing a rectangular storage space into subspaces with dimensions larger than a minimum subspace dimension, said storage space having right and left opposite vertical interior surfaces, and top and bottom opposite horizontal interior surfaces, wherein all said interior surfaces are substantially flat, wherein said horizontal interior surfaces are parallel to and spaced apart by a vertical span, and wherein said vertical interior surfaces are parallel to and spaced apart by a horizontal span, whereby intersections between said interior surfaces define surface intersections, and whereby said interior surfaces define a rectangular front opening to said storage space perpendicular to said surface intersections, comprising:

front and rear rails mounted on each of said interior surfaces, all said front rails being parallel to, and spaced a setback distance from, said front opening, and all said rear rails being parallel to, and spaced a separation distance from, said front rails;

a subspace-defining structure having a front edge and a rear edge parallel to said front edge, and right and left edges perpendicular to said front and rear edges;

front and rear rails mounted on said subspace-defining structure, said front rail being parallel to, and spaced said setback distance from, said front edge, and said rear rail being parallel to, and spaced said separation distance from, said front rail, wherein each of said rails is straight and has two ends, a rail length between said ends, and a channel extending at least partially along said rail length having a partially closed interior cross section with a rail channel aperture narrower than said interior cross section communicating between said storage space and said interior cross section, wherein at least one of said rails mounted on said interior surfaces has a widened notch wider than said rail channel aperture and having a notch length communicating with said rail channel aperture, with said notch entirely located less than said minimum subspace dimension from the nearest surface intersection;

a first front slidable lockable fastener received in said front rail mounted on said subspace-defining structure and also received in said front rail mounted on a first of said interior surfaces, and a first rear slidable lockable fastener received in said rear rail mounted on subspace-defining structure and also received in said rear rail mounted on, said first interior surface, wherein each of said slidable lockable fasteners has two legs, each leg with a head portion and a neck portion, with said head portion being larger than said rail channel aperture, but smaller than said interior cross section and also smaller than said widened notch, and said neck portion being smaller than said rail channel aperture, whereby said head portions can fit through said widened notches of said rails and be received inside said interior cross sections of said partially closed channels of said rails, and slide inside said partially closed channels, with said neck portions sliding along said rail channel aperture, to a desired position, whereby said subspace-defining structure can be locked in place when said subspace-defining structure is slid to a desired location along said rails, whereby said fasteners are slidably lockably retained at said desired location in said rails by said head portions and said neck portions, except at said widened notches;

whereby said storage space can be continuously adjustably subdivided to form a subspace larger than said minimum subspace dimension by sliding said subspace-defining structure along said rails and locking said slidable lockable fasteners when said subspace-defining structure is in a desired location on said rails that is farther from said nearest surface intersection than said minimum subspace dimension.

2. An apparatus according to claim 1, further comprising:

a second front slidable lockable fastener received in said front rail mounted on said sub-space defining structure and also received in said front rail mounted on a second interior surface opposite said first interior surface, and a second rear slidable lockable fastener received in said rear rail of said subspace-defining structure and also received in said rear rail mounted on said second interior surface, wherein each of said fasteners has two legs, each leg with a head portion and a neck portion, with said head portion being larger than said rail channel aperture, but smaller than said interior cross section and also smaller than said widened notch, and said neck portion being smaller than said rail channel aperture, whereby said head portions can fit through said widened notches of said rails and be received inside said interior cross sections of said partially closed channels of said rails, and slide inside said partially closed channels, with said neck sliding along said rail channel aperture, to a desired position, whereby said subspace-defining structure can be locked in place when said subspace-defining structure is slid to a desired location along said rails, whereby said fasteners are slidably lockably retained at said desired location in said rails by said heads and said necks, except at said widened notches.

3. An apparatus according to claim 1, wherein said rails are attached to said interior surfaces by being inset into said interior surfaces so said rail channel aperture and said widened notch are approximately flush with said interior surfaces.

4. An apparatus according to claim 1, wherein said widened notch is approximately 2 inches or approximately 5 centimeters long and extends between approximately 5 inches or approximately 13 centimeters and approximately 7 inches or approximately 18 centimeters from a surface intersection.

5. An apparatus according to claim 1, wherein said widened notch is approximately 2 inches or approximately 5 centimeters long and extends between approximately 4 inches or approximately 10 centimeters and approximately 6 inches or approximately 15 centimeters from a surface intersection.

6. An apparatus according to claim 1, wherein said rail lengths of said rails mounted on said horizontal interior surfaces are at least equal to said horizontal span, whereby said rails mounted on said horizontal interior surfaces intersect with said rails mounted on said vertical interior surfaces at said surface intersections.

7. An apparatus according to claim 1, wherein said rail lengths of said rails mounted on said vertical interior surfaces are at least equal to said vertical span, whereby said rails mounted on said vertical interior surfaces intersect with said rails mounted on said horizontal interior surfaces at said surface intersections.

8. An apparatus for adjustably continuously subdividing a rectangular storage space into subspaces with dimensions larger than a minimum subspace dimension, comprising:
- a shell having a right interior surface, a left interior surface, a top interior surface and a bottom interior surface, wherein all said interior surfaces are substantially flat, wherein said right interior surface is parallel to and spaced apart by a horizontal span from said left interior surface, and wherein said top interior surface is parallel to and spaced apart by a vertical span from said bottom interior surface,
- whereby intersections between said interior surfaces define surface intersections, and whereby said interior surfaces define a rectangular front opening to said storage space perpendicular to said surface intersections,
- front and rear rails mounted on each of said interior surfaces, all said front rails being parallel to, and spaced a setback distance from, said front opening, and all said rear rails being parallel to, and spaced a separation distance from, said front rails,
- wherein each of said rails is straight and has two ends, a rail length between said ends, and forms a channel extending at least partially along said rail length having a partially closed interior cross section with a rail channel aperture narrower than said interior cross section communicating between said storage space and said interior cross section,
- wherein at least one of said rails mounted on said interior surfaces has a widened notch wider than said rail channel aperture communicating with said rail channel aperture located at most approximately 6 inches or approximately 15 centimeters from a surface intersection, with said notch entirely located less than said minimum subspace dimension from the nearest surface intersection;
- a subspace-defining structure having a first edge and an opposite edge;
- a first front fastener and a first rear fastener each attached to said first edge of said subspace-defining structure, separated by said separation distance, wherein each of said fasteners has a head portion and a neck portion, with said head portion being larger than said rail channel aperture, but smaller than said interior cross section and also smaller than said widened notch, whereby said head portions can fit through said widened notches of at least one of said rails and be received inside the interior cross sections of said partially closed channels of at least one of said rails, and slide inside said partially closed channels, whereby said fasteners are slidably retained in said rail except at said widened notches;
- a releasable locking mechanism operably connected to said subspace-defining structure to lock said subspace-defining structure in place when said subspace-defining structure is slid to a desired location along said rail;
- whereby said space can be continuously adjustably subdivided by sliding said subspace-defining structure along said rails and locking and unlocking said locking mechanism when said subspace-defining structure is in a desired location on said rails.

9. An apparatus for continuously and adjustably subdividing a space defined by a shell having four flat interior surfaces each with a surface length, into subspaces with dimensions larger than a minimum subspace dimension, whereby intersections between said interior surfaces define surface intersections, and whereby said interior surfaces define a rectangular front opening to said storage space perpendicular to said surface intersections, comprising:
- front and rear rails attached to each of said interior surfaces, wherein said front and rear rails on each interior surface are parallel and coplanar to each other and separated by a separation distance, wherein each of said front and rear rails has two ends, a rail length between said ends, and a channel extending at least partially along said rail length having a partially closed interior cross section with a rail channel aperture narrower than said interior cross section communicating between said space and said interior cross section;
- wherein said rail length of at least one of said rails is shorter than said surface length of said interior surface to which said rail is attached by at most said minimum subspace dimension to form a fastener gap that is less than said minimum subspace dimension between an end of said rail and the nearest surface intersection;
- a subspace-defining element; and
- a first fastener and a second fastener each attached to said subspace-defining element, wherein said first fastener and said second fastener are separated by said separation distance, wherein said first fastener has a head with a head width less than said rail aperture's width and greater than said channel's width, whereby said first fastener can be inserted into said rail channel aperture of said front rail, whereby said first fastener can slidably lockably engage with said front rail, whereby said second fastener can be inserted into said rail channel aperture of said rear rail, whereby said second fastener can slidably lockably engage with said rear rail, wherein at least one of said fasteners is inserted into said rail channel aperture through said fastener gap, and whereby said subspace-defining element can be continuously adjustably positioned without creating holes in said shell by sliding said subspace-defining element and locking said first fastener and said second fastener in desired locations in said channels.

10. An apparatus for providing continuously adjustable subspace-functional elements to a storage space defined by a shell having four flat interior surfaces each with a surface length, whereby intersections between said interior surfaces define surface intersections, and whereby said interior surfaces define a rectangular front opening to said storage space perpendicular to said surface intersections, said storage space having a minimum desired subspace dimension, comprising:
- front and rear rails attached to each of said interior surfaces, wherein said front and rear rails on each interior surface are parallel and coplanar to each other and separated by a separation distance, wherein each of said front and rear rails has two ends, a rail length between said ends, and a channel extending at least partially along said rail length having a partially closed interior cross section with a rail channel aperture narrower than said interior cross section communicating between said storage space and said interior cross section, at least one of said rails attached to one of said interior surfaces having a widened notch wider than said rail channel aperture and having a notch length communicating with said rail channel aperture, located less than said minimum subspace dimension from the nearest surface intersection;

a first fastener and a second fastener each attached to said subspace-functional element, wherein said first fastener and said second fastener are separated by said separation distance, wherein said first fastener has a head with a head width less than said rail aperture's width and greater than said channel's width, whereby said first fastener can be inserted into said rail channel aperture of said front rail, whereby said first fastener can slidably lockably engage with said front rail, whereby said second fastener can be inserted into said rail channel aperture of said rear rail, whereby said second fastener can slidably lockably engage with said rear rail, and whereby said subspace-functional element can be continuously adjustably positioned by sliding said subspace-functional element and locking said first fastener and said second fastener in desired locations in said channels.

11. An apparatus for creating a storage space and for continuously and adjustably subdividing said storage space, comprising:

two pairs of rectangular panels joined to form a box open at both ends, each panel having a panel length, an interior surface and a front edge, each member of a pair having the same panel length, whereby intersections between said interior surfaces define surface intersections, and whereby said front edges define a rectangular front opening to said storage space perpendicular to said surface intersections;

for each panel, front rails inset flush into said interior surface parallel and spaced apart by a setback distance from said front edge;

for each panel, rear rails inset flush into said interior surface parallel and spaced apart by a separation distance from said front rails;

wherein each of said rails is straight and has two ends, a rail length between said ends, and forms a channel extending at least partially along said rail length having a partially closed interior cross section with a rail channel aperture narrower than said interior cross section communicating between said space and said interior cross section, wherein at least one of said rails attached to said interior surfaces has a widened notch wider than said rail channel aperture communicating with said rail channel aperture located at most approximately 6 inches or approximately 15 centimeters from a nearest surface intersection;

a first front fastener and a first rear fastener separated by said separation distance, each attached to a subspace-defining structure, wherein each of said fasteners has a head portion and a neck portion, with said head portion being larger than said rail channel aperture, but smaller than said interior cross section and also smaller than said widened notch, whereby said head portions can fit through said widened notch of at least one of said rails and be received inside the interior cross section of said partially closed channel of at least one of said rails, and slide inside said partially closed channels, whereby said fasteners are slidably retained in said rail except at said widened notches;

a releasable locking mechanism operably connected to said subspace-defining structure to lock said subspace-defining structure in place when said subspace-defining structure is slid to a desired location along said rails;

whereby said space can be continuously adjustably subdivided by sliding said subspace-defining structure along said rails and locking and unlocking said locking mechanism when said subspace-defining structure is in a desired location on said rails.

* * * * *